United States Patent
Wilson et al.

(10) Patent No.: US 6,760,514 B2
(45) Date of Patent: Jul. 6, 2004

(54) CONTINUOUSLY TUNABLE PHOTONIC CRYSTAL DROP FILTER

(75) Inventors: Carol J. Wilson, San Jose, CA (US); Mihail M. Sigalas, Santa Clara, CA (US); Curt Alan Flory, Los Altos, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 166 days.

(21) Appl. No.: 10/085,690

(22) Filed: Feb. 27, 2002

(65) Prior Publication Data

US 2003/0161577 A1 Aug. 28, 2003

(51) Int. Cl.[7] .......................... G02B 6/26; G02B 6/293
(52) U.S. Cl. .......................... 385/27; 385/50; 385/25; 385/44
(58) Field of Search .......................... 385/27, 50, 31, 385/25, 44, 129, 14

(56) References Cited

U.S. PATENT DOCUMENTS

| | | | | |
|---|---|---|---|---|
| 3,589,794 A | * | 6/1971 | Marcatilli | 385/42 |
| 5,784,400 A | * | 7/1998 | Joannopoulos et al. | 372/96 |
| 6,075,915 A | * | 6/2000 | Koops et al. | 385/125 |
| 6,130,969 A | | 10/2000 | Villeneuve et al. | 385/27 |
| 6,198,860 B1 | * | 3/2001 | Johnson et al. | 385/28 |
| 6,310,991 B1 | * | 10/2001 | Koops et al. | 385/14 |
| 6,411,752 B1 | * | 6/2002 | Little et al. | 385/17 |
| 2002/0159733 A1 | * | 10/2002 | Flory et al. | 385/125 |
| 2002/0191905 A1 | * | 12/2002 | Prather et al. | 385/24 |
| 2003/0161577 A1 | * | 8/2003 | Wilson et al. | 385/27 |

* cited by examiner

*Primary Examiner*—Mike Stahl
*Assistant Examiner*—Michael J. Stahl

(57) ABSTRACT

A photonic crystal drop filter apparatus and a method for tuning a photonic crystal drop filter. The photonic crystal drop filter has a photonic crystal having first waveguide for transmitting light having a frequency within a bandgap of the photonic crystal, and a second waveguide. The second waveguide is connected to the first waveguide by a resonant cavity for extracting at least one wavelength of the light transmitted by the first waveguide and redirecting the extracted light to the second waveguide. A tuning device is included in the apparatus to tune the wavelength of the extracted light over a full range of wavelengths. The apparatus is particularly suitable as an extraction device for optical communications systems such as a WDM communications system wherein it is necessary to extract one or more carrier signals from a plurality of carrier signals.

21 Claims, 3 Drawing Sheets

CONTINUOUSLY TUNABLE PHOTONIC CRYSTAL DROP FILTER

BACKGROUND OF THE INVENTION

1. Technical Field of the Invention

The present invention relates generally to the field of photonic crystals; and, more particularly, to a photonic crystal drop filter and to a method for tuning the transmission wavelengths of a photonic crystal drop filter.

2. Description of Related Art

Wave division multiplexing is a process that permits the transmission capacity of an optical communications system to be increased. In particular, in a wave division multiplexer (WDM) system, information is transmitted using a plurality of optical carrier signals, each carrier signal having a different optical wavelength. By modulating each carrier signal with a different one of a plurality of information signals, the plurality of information signals can be simultaneously transmitted through a single waveguiding device such as a single optical fiber.

For a WDM system to function properly, the system must have the capability of extracting a carrier signal at a certain wavelength from one waveguide and adding the signal at that wavelength to another waveguide so as to redirect the path through which the extracted carrier signal travels.

FIG. 1 is a block diagram that schematically illustrates components of a WDM communications system. The system is generally designated by reference number 10, and includes a signal source 12 that transmits a plurality of carrier signals at different optical wavelengths through an optical fiber or other waveguiding device 14. The optical fiber 14 is connected to an extraction device 16 that is capable of extracting one or more of the carrier signals carried by the optical fiber 14 and redirecting the extracted signal or signals to another optical fiber or waveguiding device 18. The remaining carrier signals carried by the optical fiber 14 are transmitted through the extraction device 16 to an optical fiber 20 or the like. The carrier signals carried by optical fibers 18 and 20 are then further processed by processing structure not illustrated in FIG. 1.

A practical WDM communications system must be capable of simultaneously transmitting a large number of carrier signals; and, therefore, must be able to carry a large number of light wavelengths. In the future, WDM systems will be required to carry even more carrier signals than today. The number of wavelengths that can be extracted by known extraction devices, however, is finite; and only a distinct set of wavelengths can be derived from any particular extraction device design. Furthermore, he wavelength separation of the carrier signals will be less in future WDM systems; and known extraction devices do not have the resolution that will be required to selectively extract the more closely spaced signals.

For example, drop filters are commonly used in optical communications circuits to extract light of a particular wavelength from one waveguide and direct the extracted light to another waveguide. In effect, a drop filter allows light of one wavelength to be dropped from one path in an optical communications circuit and added to another path in the circuit.

Known drop filters, however, can be designed to extract and redirect only a few distinct, well-separated wavelengths. Accordingly, known drop filters are not fully satisfactory for use as an extraction device in a WDM system that requires the capability of extracting carrier signals carried by light having a large number of different wavelengths.

Photonic crystals (PC) are periodic dielectric structures that can prohibit the propagation of light in certain frequency ranges. More particularly, photonic crystals are structures that have spatially periodic variations in refractive index; and with a sufficiently high refractive index contrast, photonic bandgaps can be opened in the structure's optical transmission characteristics. (The term "photonic bandgap" as used herein and as is commonly used in the art is a frequency range in which propagation of light through the photonic crystal is prevented. In addition, the term "light" as used herein is intended to include radiation throughout the electromagnetic spectrum, and is not limited to visible light.)

A photonic crystal that has spatial periodicity in three dimensions can prevent the propagation of light having a frequency within the crystal's bandgap in all directions; however, the fabrication of such a structure is often technically challenging. An alternative is to utilize a two-dimensional photonic crystal slab that has a two-dimensional periodic lattice incorporated within it. In a two-dimensional photonic crystal slab, light propagating in the slab is confined in the direction perpendicular to a major surface of the slab via total internal reflection, and light propagating in the slab in directions other than perpendicular to a major surface is controlled by the properties of the photonic crystal slab. A two-dimensional photonic crystal slab has the advantage that it is compatible with the planar technologies of standard semiconductor processing; and, in addition, the planar structure of the slab makes an optical signal in a waveguide created in the slab more easily accessible to interaction. As a result, a two-dimensional photonic crystal slab is susceptible to being used to create active devices.

FIG. 2 is a schematic, perspective view of a two-dimensional photonic crystal slab that is known in the prior art; and is provided to assist in explaining the present invention. The photonic crystal slab is generally designated by reference number 30, and comprises a slab body 32 having a two-dimensional periodic lattice comprising an array of posts 34 therein. As shown in FIG. 2, the posts 34 are oriented parallel to one another and extend through the slab body from top face 36 to bottom face 38 thereof.

The two-dimensional photonic crystal slab 30 can take various forms. For example, the posts 34 can comprise rods formed of a first dielectric material, and the slab body 32 can comprise a body formed of a second dielectric material that differs in dielectric constant from that of the first dielectric material. Alternatively, the posts can comprise holes formed in a slab body of dielectric material; or the posts can comprise rods of dielectric material and the slab body can be air, or another gas, or a vacuum. In addition, the posts can be arranged to define a square array of posts; or they can be arranged in a different manner, such as in a rectangular array or a triangular array.

In a two-dimensional photonic crystal slab such as illustrated in FIG. 2, light propagating in the slab is confined in the direction perpendicular to the slab faces 36 and 38 via total internal reflection. Light propagating in the slab in directions other than perpendicular to the slab faces, however, is controlled by the spatially periodic structure of the slab. In particular, the spatially periodic structure causes a photonic bandgap to be opened in the transmission characteristics of the structure within which the propagation of light through the slab is prevented. Specifically, light propagating in the two-dimensional photonic crystal slab 30 of FIG. 2 in directions other than perpendicular to a slab face and having a frequency within a bandgap of the slab will not propagate through the slab; while light having frequencies outside the bandgap is transmitted through the slab unhindered.

It is known that the introduction of defects in the periodic lattice of a photonic crystal allows the existence of localized electromagnetic states that are trapped at the defect site, and that have resonant frequencies within the bandgap of the surrounding photonic crystal material. By arranging these defects in an appropriate manner, a waveguide can be created in the photonic crystal through which light having frequencies within the bandgap of the photonic crystal (and that thus would normally be prevented from propagating through the photonic crystal) is transmitted through the photonic crystal.

FIG. 3 is a schematic, cross-sectional view that illustrates a two-dimensional photonic crystal slab waveguide apparatus 40 that is known in the prior art. Apparatus 40 comprises a photonic crystal slab 42 comprised of a rectangular array of dielectric rods 44 in air. A region of defects in the photonic crystal slab creates a waveguide 46 through which light having a frequency within the bandgap of the surrounding photonic crystal material can propagate. In the photonic crystal slab of FIG. 3, the region of defects is created by omitting one row of the rods 44. The region of defects can also be created in other ways; for example, by altering the rods in one or more rows such as by removing portions of the rods or by changing the diameter of the rods. The region of defects can extend in a straight line, as shown in FIG. 3, to define a straight waveguide; or the region can be arranged to include a bend, for example, a 90 degree bend, to define a bent waveguide.

Both theoretical and experimental work have demonstrated the efficient guidance of light in a two-dimensional photonic crystal slab waveguide device (see "Demonstration of Highly Efficient Waveguiding in a Photonic Crystal Slab at the 1.5 µm Wavelength", S. Lin, E. Chow, S. Johnson and J. Joannopoulos, Opt. Lett. 25, pp 1297–1299, 2000). In addition, there has been some investigation into potential applications for interacting with the guided optical modes of the waveguide device. Applications that have previously been discussed include tunable, waveguide dependent devices (see commonly owned, copending U.S. patent application Ser. No. 09/846,856) and channel drop filters (see U.S. Pat. No. 6,130,969).

Photonic crystal devices such as are discussed in U.S. patent application Ser. No. 09/846,856 do not extract and redirect specific wavelengths as are needed in a WDM communications system. In addition, although the tunability of such devices has been demonstrated, the range of tuning of the devices is rather limited. U.S. Pat. No. 6,130,969 discloses a photonic crystal channel drop filter for WDM communications systems; however, the described filter is not tunable. For a drop filter to function effectively in a WDM system, it is desirable that the filter be tunable over a full range of operating frequencies. Thus, existing photonic crystal-based devices are generally not fully satisfactory for use as an extraction device in a WDM system.

Accordingly, there is a need for an extraction device for use in a WDM communications system and for other applications that is capable of extracting and redirecting one or more wavelengths from an optical signal that includes a plurality of wavelengths; and that is continuously tunable so as to be able to extract any selected at least one wavelength from the optical signal.

SUMMARY OF THE INVENTION

The present invention provides a tunable, photonic crystal drop filter apparatus that is capable of extracting and redirecting any selected at least one wavelength from an optical signal that includes a plurality of wavelengths.

A photonic crystal drop filter apparatus according to the present invention comprises a photonic crystal having first waveguide for transmitting light having a frequency within a bandgap of the photonic crystal, and a second waveguide. The second waveguide is connected to the first waveguide by a resonant cavity for extracting at least one wavelength of the light transmitted by the first waveguide and redirecting the extracted light to the second waveguide. The apparatus also includes a tuning member for controlling the at least one wavelength of the light extracted from the first waveguide.

The resonant cavity modifies the transmission characteristics of the first waveguide by creating one or more transmission zeros, that comprise narrow frequency ranges within the bandgap of the photonic crystal material at which light that is otherwise capable of being transmitted through the first waveguide is prevented from propagating through the first waveguide, i.e., is "filtered" out of, the first waveguide. By connecting a second waveguide to the first waveguide through the resonant cavity, the light that is prevented from propagating through the first waveguide is redirected to the second waveguide. As a result, a drop filter is provided that is capable of removing light of one or more wavelengths from the first waveguide and redirecting the removed light to the second waveguide.

According to one embodiment of the invention, the tuning member extends into the second waveguide and is movable within the second waveguide. The wavelengths of the light that can be extracted from the first waveguide is a function of the position of the dielectric tuning member with respect to the resonant chamber, and by adjusting the position of the dielectric tuning member, the extracted wavelengths can be precisely controlled.

According to another embodiment of the invention, a moving device is connected to the dielectric tuning member to move the dielectric tuning member to desired positions in the second waveguide so as to provide the apparatus with the capability of being continuously tuned. Preferably, the moving device comprises a micro-mover capable of moving the dielectric tuning member by very precise amounts so as to permit the wavelengths of the extracted light to be very precisely controlled.

A photonic crystal drop filter apparatus according to the present invention is capable of precisely controlling the wavelengths of light extracted from an optical signal and can be continuously tuned to extract any selected wavelengths within a wide range of wavelengths. The apparatus is, accordingly, particularly suitable for use as an extraction device in WDM communications systems and in other applications that require the extraction of one or more wavelengths of light from a signal that includes a plurality of wavelengths.

Yet further advantages and specific features of the present invention will become apparent hereinafter in conjunction with the following detailed description of embodiments of the invention.

DETAILED DESCRIPTION OF THE EXEMPLARY EMBODIMENTS OF THE INVENTION

Figure 4:
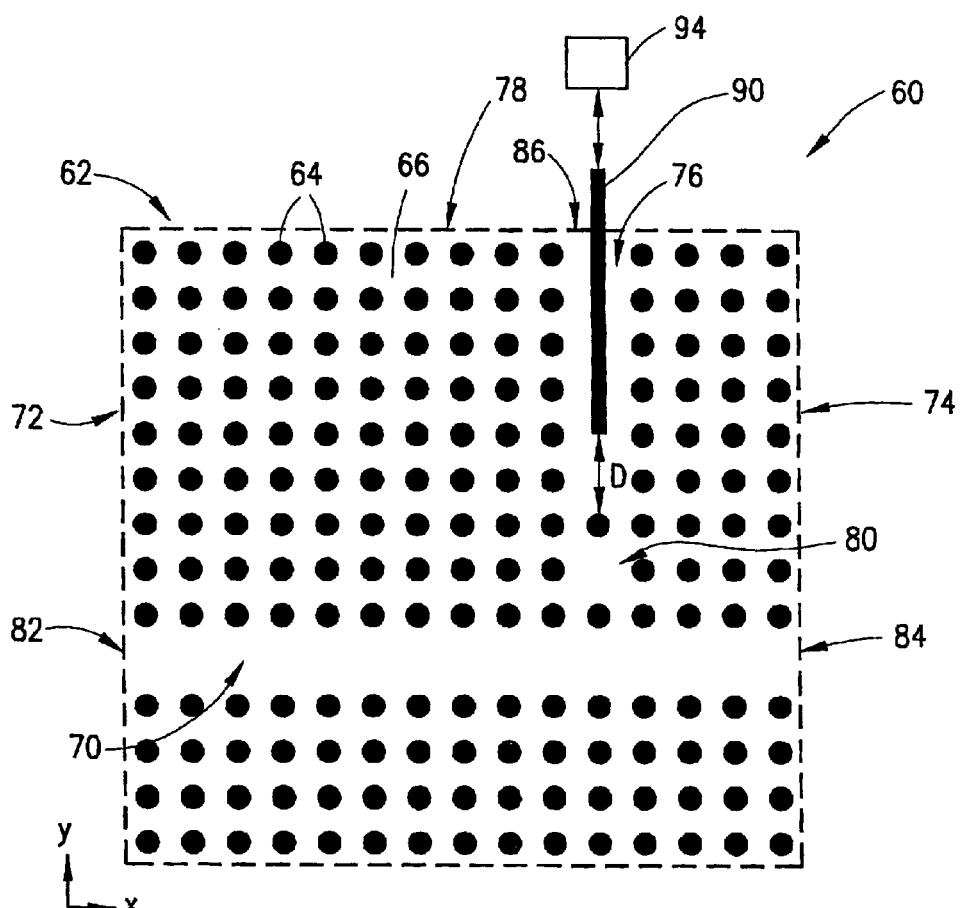
FIG. 4 is a schematic, cross-sectional view of a two-dimensional photonic crystal drop filter apparatus according to an embodiment of the present invention.

FIG. 4 is a schematic, cross-sectional view of a two-dimensional photonic crystal drop filter apparatus according to an embodiment of the present invention. The apparatus is generally designated by reference number 60, and comprises a two-dimensional photonic crystal slab 62 (shown in dashed line in FIG. 4). Photonic crystal slab 62 includes a two-dimensional periodic lattice, comprising a two-dimensional array of posts 64, embedded within a slab body 66. In the embodiment illustrated in FIG. 4, posts 64 comprise dielectric rods and the slab body comprises air. In alternative embodiments, the posts can comprise holes formed in a slab body of dielectric material; or the posts can comprise rods of a first dielectric material and the slab body can comprise another gas or a vacuum, or a body formed of a second dielectric material that differs in dielectric constant from that of the first dielectric material.

Apparatus 60 also includes a first waveguide 70 that extends through the photonic crystal slab 62 from one side 72 to the opposite side 74 thereof, and a second waveguide 76 that extends into the photonic crystal slab 62 from a third side 78. The first waveguide 70 is created by omitting a single line of dielectric rods 64 from the array, and the second waveguide 76 is created by omitting a portion of a single line of dielectric rods 64 from the array. In alternative embodiments, the first and second waveguides can be created in other ways; for example, by removing portions of the rods or by changing the diameter of the rods.

Photonic crystal drop filter apparatus 60 also includes a resonant cavity 80 that connects the first and second waveguides. In the embodiment illustrated in FIG. 4, the resonant cavity is created by omitting one rod from the array. The resonant cavity could also be of a different configuration and a rod could be altered as by changing its diameter or by removing a portion of the rod rather than omitting the rod, if desired. As shown in FIG. 4, the resonant cavity extends from a sidewall of the first waveguide, and the second waveguide extends from the resonant cavity in a direction perpendicular to the first waveguide. In other embodiments, the second waveguide can extend from the resonant cavity at different angles with respect to the first waveguide.

The two-dimensional photonic crystal slab 62 having the first and second waveguides 70 and 76 and the resonant cavity 80 interconnecting the first and second waveguides, functions as a drop filter when a light signal comprised of a plurality of wavelengths of light is transmitted through the first waveguide. In particular, if an input light signal comprised of a plurality of wavelengths is directed into the first waveguide 70 at input end 82, one or more of the wavelengths will be extracted from or "filtered" out of the input light signal and redirected to the second waveguide 76. The remainder of the input light signal will continue to be transmitted through the first waveguide 70 and will exit the first waveguide at output end 84. In effect, the resonant cavity 80 functions to modify the transmission characteristics of the first waveguide by creating a transmission zero within the bandgap of the photonic crystal material at which light that is otherwise capable of propagating through the first waveguide is prevented from propagating through the first waveguide. The frequency of the transmission zero corresponds to the resonant frequency of the resonant chamber. The wavelength of light that is prevented from passing through the first waveguide is redirected to the second waveguide and exits the second waveguide at output end 86.

The wavelength of the light that is extracted from the first waveguide is a function of the configuration of the resonant cavity as will be explained more fully hereinafter. Accordingly, by appropriately designing the resonant cavity, a distinct wavelength or a set of distinct wavelengths can be extracted from the first waveguide and redirected to the second waveguide.

As illustrated in FIG. 4, the photonic crystal drop filter apparatus 60 further includes a dielectric tuning member 90 that is axially aligned with and extends into the second waveguide 76. The wavelength of the light that is extracted from the first waveguide is a function of the position of the dielectric tuning member relative to the resonant cavity; and by controlling the position of the dielectric tuning member, the resonant frequency of the resonant chamber, and hence the wavelength of the light that can be extracted from the first waveguide can be controlled. The dielectric tuning member, in effect, itself functions as a waveguide that adjusts the wavelength of the light extracted from the light in the first waveguide and redirects the extracted light along a different path, i.e., into the second waveguide. Depending on the position of the dielectric tuning member with respect to the resonant cavity, there are many ranges of positions along which the adjustments can occur as will be described hereinafter.

According to an embodiment of the invention, the dielectric tuning member comprises a bar-shaped element that extends into the second waveguide 76 and is of substantially the same cross-sectional size as the second waveguide. The tuning member 90 may be of any appropriate cross-sectional shape such as circular, square or other rectangular shape. As will be explained more fully hereinafter, in other embodiments of the invention, the dielectric tuning member can be positioned outside of the second waveguide The operation of the photonic crystal drop filter apparatus of FIG. 4 was demonstrated in a system based on the microwave region. In the demonstration, the photonic crystal consisted of 3.18 mm diameter alumina rods forming a square lattice having a lattice constant (lattice spacing) of 8.333 mm. The refractive index of the alumina rods was 3.1 and the rods were 12 cm in length, (a sufficient length to be considered as being infinitely long to a reasonable approximation). The transmission through the apparatus at the output end 84 was measured using an Agilent 8509A network analyzer and two microwave horn antennas. The transmitting antenna was located at the input end 82 of the first waveguide and the receiving antenna was located at the output end 84 of the first waveguide.

The two-dimensional photonic crystal slab was constructed as shown in FIG. 4. The dielectric tuning member was inserted in the second waveguide. A reference for the position of the dielectric tuning member was established as the interface between the resonant cavity and the second waveguide, and the dielectric tuning member was then moved from this position in the direction of the second waveguide by a distance D as shown in FIG. 4, and the transmission was measured at the output end of the first waveguide 84. There are notches in the transmission (transmission minima) due to the resonant cavity. The frequencies of the notches are plotted in FIG. 5 that is a graph in which the frequencies of the transmission notches are plotted along the y-axis and the distance D from the resonant cavity is plotted along the x-axis.

The extracted frequency for the structure of FIG. 4 without the dielectric tuning member 90 was 13.61 GHz. The data shown in solid lines in FIG. 5 indicates that the apparatus can be tuned to different frequencies around 13.61 GHz. The frequency changes linearly as a function of D as shown by the dashed lines in FIG. 5, that were obtained by linear fit to the original data.

Figure 5:
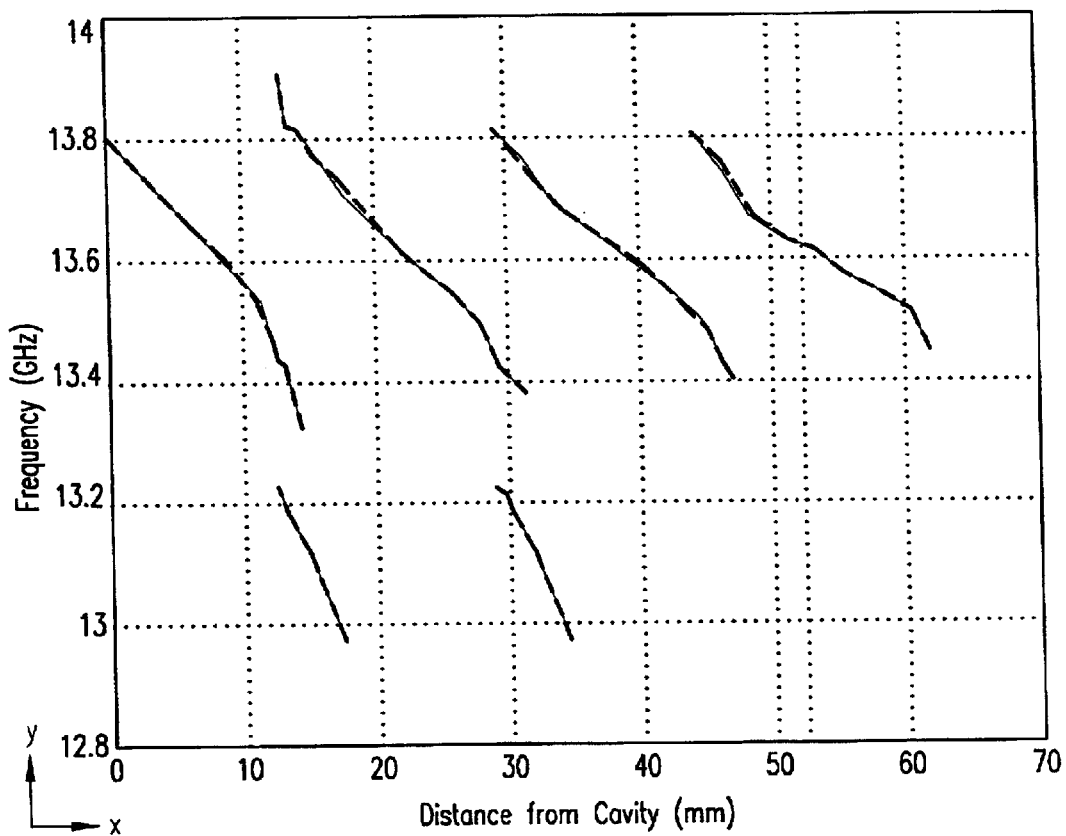
FIG. 5 is a graph that illustrates the frequencies of transmission notches measured at an output to the first waveguide in the apparatus of FIG. 4 as a function of tuning member distance from the resonant cavity in the apparatus of FIG. 4.

There are actually many values of D at which the plate can be used to tune a given frequency. The repetition distance is about 15.5 mm as shown in FIG. 5. Also, it is to be noted that at certain distances, there are transmission notches at multiple frequencies.

As is well-known to those skilled in the art, the above-described characteristics in the microwave regime can readily be extended to the optical regime by appropriate scaling of the sizes of the photonic crystal, the resonant cavity and the dielectric tuning member.

Figure 6:
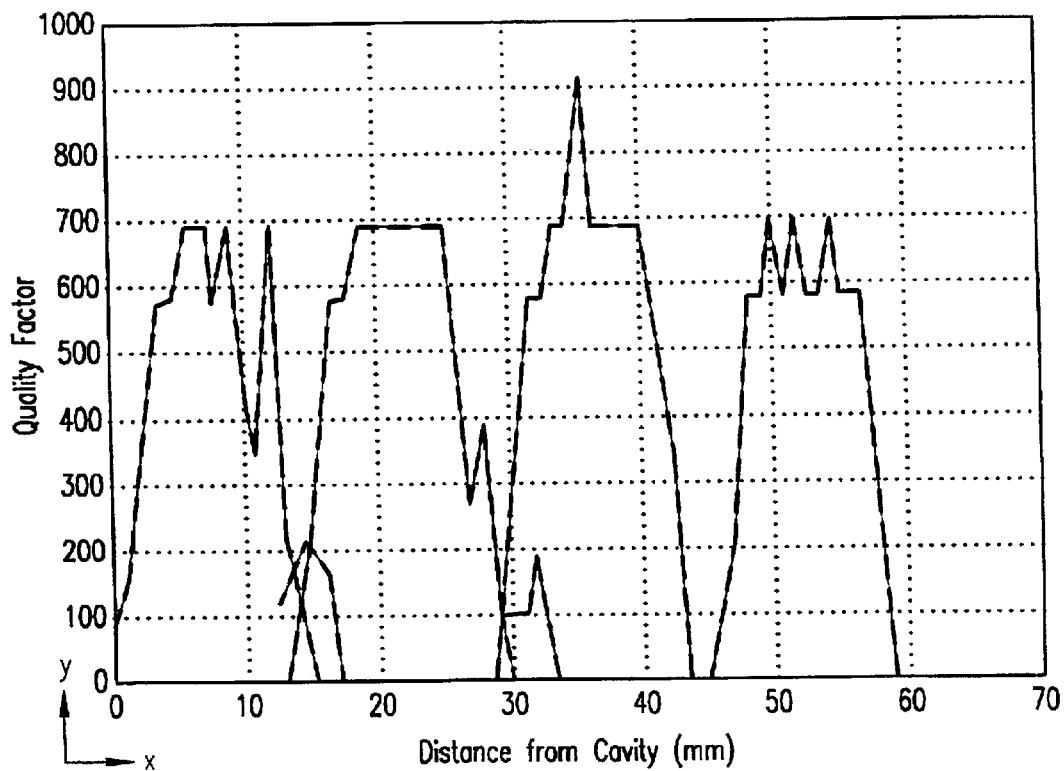
FIG. 6 is a graph that illustrates the quality factor as a function of tuning member distance from the resonant cavity in the apparatus of FIG. 4.

FIG. 6 is a graph that illustrates the quality factor, Q, of the various resonances of the different frequencies, plotted along the y-axis, as a function of the distance D of the dielectric tuning member from the resonant cavity, plotted along the x-axis. Because of the values of the quality factors (about 600 on the average), the values are very sensitive to small imperfections of the photonic crystal as well as the surroundings creating the high fluctuations in their values. In general, the Q factors decrease around the regions where the second transmission notches appear. However, in other regions, the Q values are quite high making the apparatus quite attractive for WDM applications.

The photonic crystal drop filter apparatus 60 preferably also includes a device, schematically illustrated at 94 in FIG. 4, for moving the dielectric tuning member to different positions within the second waveguide. Preferably, the moving device comprises a micro-mover that is capable of moving the dielectric tuning member by very small and very precise amounts. Such a capability is important because the finer the movement of the dielectric tuning member, the finer the control over the wavelength of the light extracted from the first waveguide.

Figure 7:
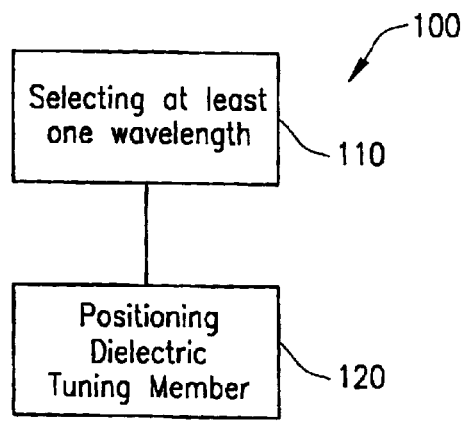
FIG. 7 is a flow chart that illustrates steps of a method for tuning a photonic crystal drop filter according to another embodiment of the present invention.
Figure 3:
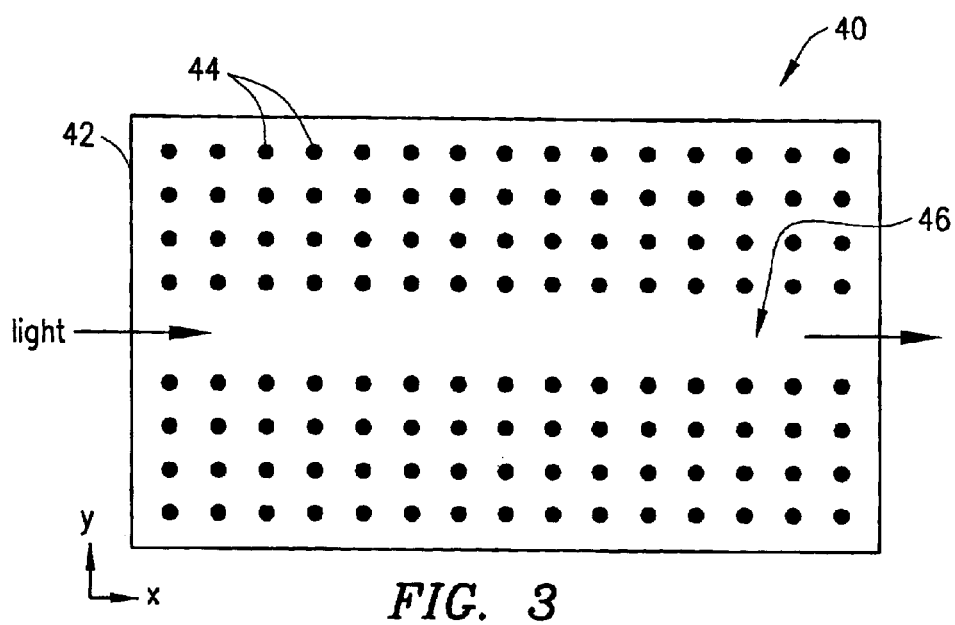
FIG. 3 is a schematic, cross-sectional view of a two-dimensional photonic crystal slab waveguide apparatus that is known in the prior art.

FIG. 7 is a flow chart that illustrates steps for tuning a photonic crystal drop filter apparatus according to another embodiment of the present invention. The method is generally designated by reference number 100 and includes the steps of selecting a desired at least one wavelength of light to be extracted from a first waveguide that transmits a light signal having a plurality of wavelengths (step 110); and, thereafter, positioning a dielectric tuning member with respect to a resonant cavity in the photonic crystal (step 120), the wavelength of the one or more wavelengths of the extracted light being a function, for example, of the position of the dielectric tuning member with respect to the resonant cavity.

In the embodiment illustrated in FIG. 4, the resonant cavity was created by omitting a single rod 64 in the array of rods. In alternative embodiments, rather than omitting the rod, the rod can be replaced by a rod of different diameter. The single rod can, for example, be sized to adjust the center extraction wavelength of the apparatus, and the dielectric tuning member can be used to fine tune the frequency as needed. In another embodiment of the invention, the resonant cavity can be created by omitting more than one rod. By removing a plurality of rods, two or more frequency regions can be fine tuned using the same movable dielectric tuning member.

Figure 1:
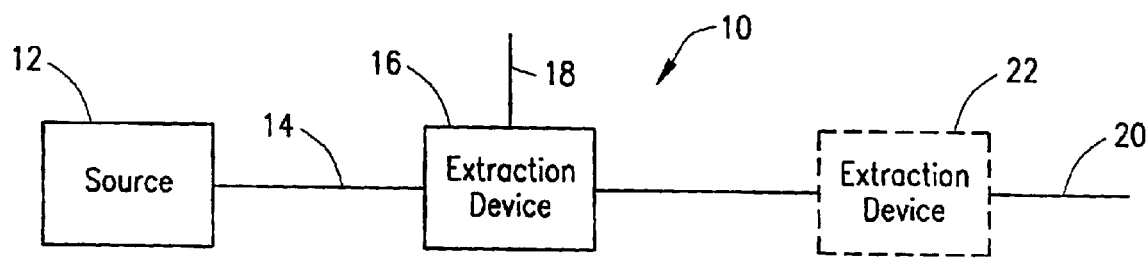
FIG. 1 is a block diagram that schematically illustrates components of a WDM communications system.
Figure 2:
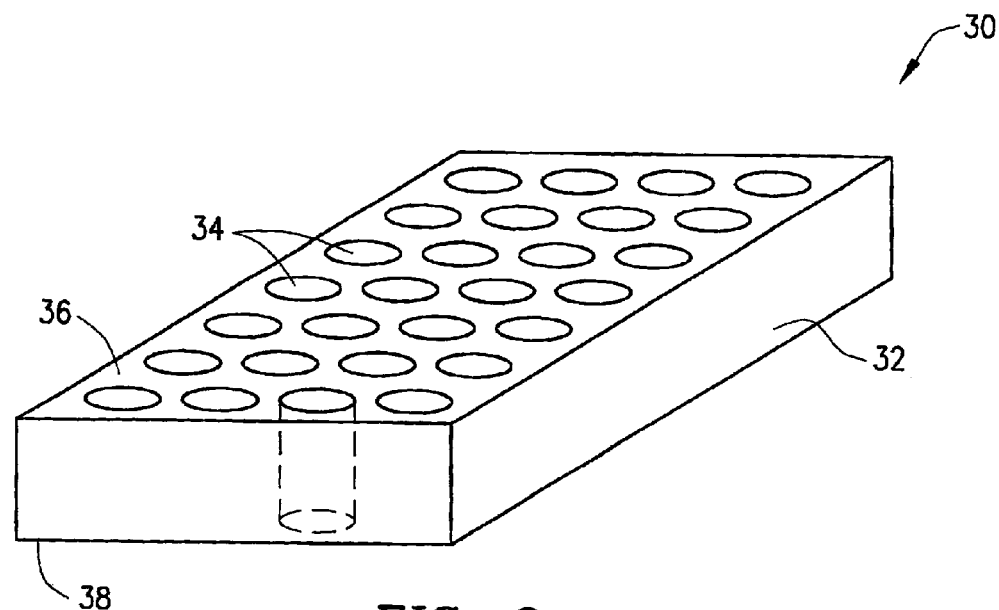
FIG. 2 is a schematic, perspective view of a two-dimensional photonic crystal slab that is known in the prior art.

According to another embodiment of the invention, a plurality of photonic crystal drop filter apparatus can be connected at different locations along an optical fiber in an optical communications system as illustrated by the further extraction device 22 shown in dotted line in FIG. 1. Each apparatus can be fine tuned to a particular frequency region to extract a particular wavelength of light from the optical fiber. In such a system, the plurality of apparatus must be several unit cells away from each other to avoid interference (a "unit cell" is defined as a cell having dimensions in the x and y directions of the photonic crystal, as shown in FIG. 4, equal to the spacing between the rods in the crystal).

It has been found that the dielectric tuning member 90 is effective in tuning the frequency of the extracted wavelength even when the member is positioned outside of the second waveguide. Accordingly, the dielectric tuning member can be outside the second waveguide in other embodiments of the invention. When the dielectric tuning member is positioned outside the second waveguide, the member can be oriented to be parallel to the second waveguide or at an angle to the second waveguide, including perpendicular to the second waveguide. In general, however, the dielectric tuning member should be spaced from the second waveguide by a distance of no more than about one unit cell. In another embodiment of the invention, the optical fiber 18 (FIG. 1) can, itself, function as a dielectric tuning member. In such an embodiment, the extracted frequencies can be tuned by moving the optical fiber.

The apparatus of the present invention can be used either as a tunable drop filter (using a low dielectric tuning plate or an optical fiber), or as a tunable stub tuner (using a high dielectric tuning plate).

While what has been described constitute exemplary embodiments of the invention, it should be recognized that the invention can be varied in numerous ways without departing from the scope thereof. For example, although the embodiments described herein comprise two-dimensional photonic crystal drop filter apparatus; the invention can also be applied to a fully three-dimensional photonic crystal apparatus. Because the invention can be varied in numerous ways, it should be understood that the invention should be limited only insofar as is required by the scope of the following claims.

We claim:

1. A photonic crystal drop filter apparatus, comprising:
   a photonic crystal;
   a first waveguide in said photonic crystal for transmitting light having a frequency within a bandgap of said photonic crystal;
   a second waveguide in said photonic crystal;
   a resonant cavity connecting the first and second waveguides for extracting at least one wavelength of the light transmitted in said first waveguide and redirecting the extracted light to said second waveguide; and a tuning member for controlling the at least one wavelength of the light extracted from said first waveguide, wherein the at least one wavelength of the light extracted from said first waveguide is a function of a position of said tuning member relative to said resonant cavity.

2. The A photonic crystal drop filter apparatus, comprising:

a photonic crystal;

a first waveguide in said photonic crystal for transmitting light having a frequency within a bandgap of said photonic crystal;

a second waveguide in said photonic crystal;

a resonant cavity connecting the first and second waveguides for extracting at least one wavelength of the light transmitted in said first waveguide and redirecting the extracted light to said second waveguide; and a tuning member for controlling the at least one wavelength of the light extracted from said first waveguide, wherein said tuning member comprises a dielectric tuning member in said second waveguide.

3. The photonic crystal drop filter apparatus according to claim 2, wherein said first waveguide extends through said photonic crystal from one side thereof to a second opposite side thereof, and wherein said second waveguide extends from said resonant cavity to a third side of said photonic crystal for transmitting said extracted light out of said apparatus.

4. The photonic drop filter apparatus according to claim 2, wherein said dielectric tuning member comprises an optical fiber.

5. The photonic crystal drop filter apparatus according to claim 1, wherein said apparatus further includes a moving device connected to said tuning member for adjusting the position of said tuning member relative to said resonant cavity for extracting a selected at least one wavelength of light from said first waveguide.

6. The photonic crystal drop filter apparatus according to claim 5, wherein said moving device comprises a micromover moving device.

7. A photonic crystal drop filter apparatus according to claim 3, wherein said photonic crystal comprises a two-dimensional photonic crystal slab having a two-dimensional periodic lattice incorporated in a slab body, and wherein said first waveguide comprises a first line of defects in said two-dimensional periodic lattice extending from a first side to a second opposite side of said two-dimensional photonic crystal slab, and wherein said second waveguide comprises a line of defects in said two-dimensional periodic lattice extending from said resonant cavity to a third side of said two-dimensional photonic crystal slab.

8. The photonic crystal drop filter apparatus according to claim 7, wherein said periodic lattice comprises an array of posts, and wherein said first waveguide is created by omitting a first line of said posts and said second waveguide is created by omitting a portion of a second line of said posts.

9. The photonic crystal drop filter apparatus according to claim 8, wherein said array of posts comprises an array of dielectric rods and said slab body comprises air.

10. The photonic crystal drop filter apparatus according to claim 8, wherein said resonant chamber is created by omitting at least one post of said array of posts.

11. An optical communications system, comprising:

a photonic crystal;

a first waveguiding structure in said photonic crystal for transmitting light of a plurality of different wavelengths, each of said plurality of wavelengths of light carrying a different information signal;

a second waveguiding structure in said photonic crystal;

a resonant cavity connecting said first and second waveguiding structures for removing at least one of said plurality of wavelengths of light transmitted by said first waveguiding structure and for redirecting the removed light to said second waveguiding structure; and a dielectric tuning member for tuning the at least one of said plurality of wavelengths of light removed from said first waveguiding structure, wherein the at least one wavelength of the light extracted from said first waveguide is a function of a position of said tuning member relative to said resonant cavity.

12. The optical communications system according to claim 11, wherein said dielectric tuning member comprises a dielectric tuning member in said second waveguiding structure.

13. An optical communications system, comprising:

a photonic crystal;

a first waveguiding structure in said photonic crystal for transmitting light of a plurality of different wavelengths, each of said plurality of wavelengths of light carrying a different information signal;

a second waveguiding structure in said photonic crystal;

a resonant cavity connecting said first and second waveguiding structures for removing at least one of said plurality of wavelengths of light transmitted by said first waveguiding structure and for redirecting the removed light to said second waveguiding structure; and a dielectric tuning member for tuning the at least one of said plurality of wavelengths of light removed from said first waveguiding structure, wherein said dielectric tuning member comprises said second waveguiding structure.

14. The optical communications system according to claim 13, wherein said second waveguiding structure comprises an optical fiber.

15. The optical communications system according to claim 11, wherein said apparatus further includes a moving device connected to said dielectric tuning member for adjusting the position of said dielectric tuning member relative to said resonant cavity for removing a selected at least one wavelength of light from said first waveguiding structure.

16. The optical communications system according to claim 15, wherein said moving device comprises a micromover moving device.

17. The optical communications system according to claim 11, wherein said photonic crystal comprises a two-dimensional photonic crystal slab having a two-dimensional periodic lattice incorporated in a slab body, and wherein said first waveguiding structure comprises a first line of defects in said two-dimensional periodic lattice extending from a first side to an opposite second side of said two-dimensional photonic crystal slab, and said second waveguiding structure comprises a line of defects in said two-dimensional periodic lattice extending from said resonant cavity to a third side of said two-dimensional photonic crystal slab.

18. The optical communications system according to claim 11, wherein said optical communications system comprises a wavelength division multiplexer communications system.

19. In a photonic crystal drop filter comprising a photonic crystal, a first waveguide in said photonic crystal for transmitting light having a frequency within a bandgap of said photonic crystal, a second waveguide in said photonic crystal, and a resonant cavity connecting said first and second waveguides for extracting at least one wavelength of the light transmitted by the first waveguide, a method for tuning said photonic crystal drop filter comprising:

selecting a desired at least one wavelength of light to be extracted from said first waveguide; and positioning a dielectric tuning member with respect to said resonant cavity, the at least one wavelength of light extracted from said first waveguide being a function of the position of said dielectric tuning member with respect to said resonant cavity.

20. The method according to claim 19, wherein said dielectric tuning member comprises a dielectric tuning member extending into said second waveguide, and wherein the positioning step comprises adjusting the distance of an end of said dielectric tuning member with respect to said resonant cavity.

21. The method according to claim 19, further including the step of moving said dielectric tuning member to desired positions for tuning said extracted at least one wavelength within a full range of wavelengths.

* * * * *